United States Patent [19]
Blomberg

[11] 3,763,716
[45] Oct. 9, 1973

[54] VIBRATIONLESS MACHINE

[75] Inventor: Folke Ivar Blomberg, Lidingo, Sweden

[73] Assignee: Husqvarna Vapenfabriks Aktienbolag, Huskvarna, Sweden

[22] Filed: Feb. 15, 1972

[21] Appl. No.: 226,633

[52] U.S. Cl............ 74/604, 123/192 R, 123/192 B
[51] Int. Cl............................................. F16f 15/00
[58] Field of Search.................. 74/604; 123/192 R, 123/192 B

[56] References Cited
UNITED STATES PATENTS

| | | | |
|---|---|---|---|
| 1,738,532 | 12/1929 | Harbour | 123/192 R |
| 1,958,148 | 5/1934 | Kjaer | 123/192 R |
| 1,640,634 | 8/1927 | Wise | 74/604 X |

*Primary Examiner*—Charles J. Myhre
*Assistant Examiner*—F. D. Shoemaker
*Attorney*—John C. Holman et al.

[57] ABSTRACT

The invention is mainly characterized by the use of movement mechanisms providing a motion of a machine body relatively a base structure which motion is intended to imitate a circular path of a common center of gravity of a piston-crank-mechanism in the machine and to be assimilated by elastic means between the machine body and the base structure moreover, the mechanisms could execute a pendulum moment in the movement plane of a connecting rod in the piston-crank-mechanism in a direction opposed to the pendulum moment of inertia of the connecting rod.

7 Claims, 19 Drawing Figures

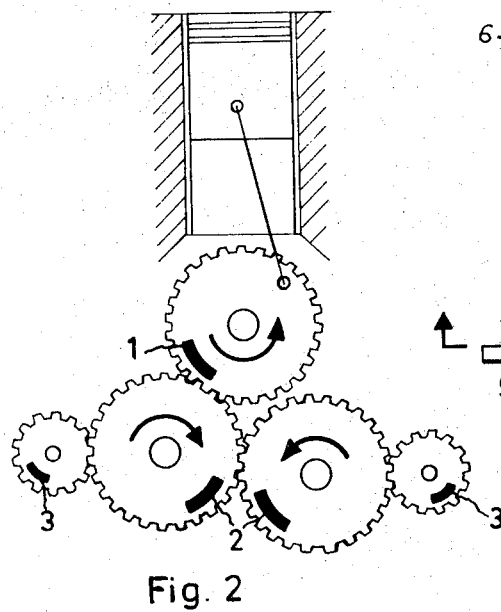
Fig. 2
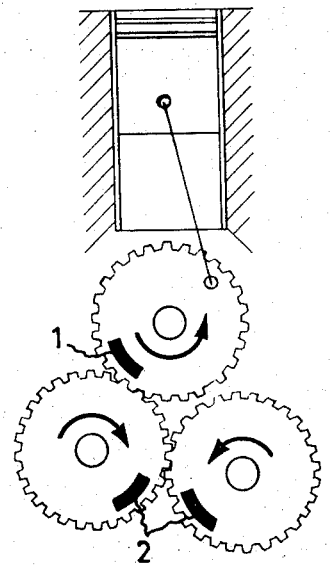
Fig. 1
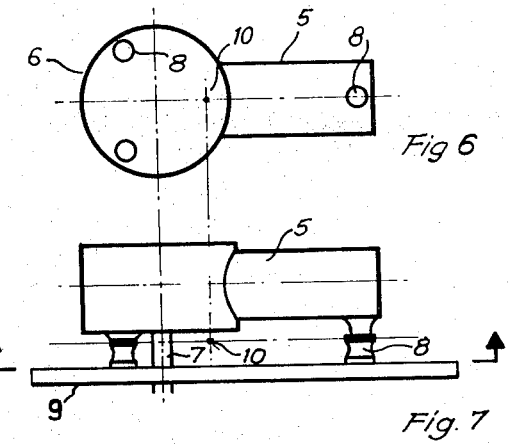
Fig. 6
Fig. 7
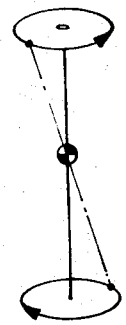
Fig. 16

VIBRATIONLESS MACHINE

BACKGROUND OF THE INVENTION

The present invention relates to a vibration free machine, preferably an internal combustion engine.

The movable parts of a piston engine give rise to large dynamic forces. With multi-cylinder machines, the dynamic forces generated by the individual cylinder units can be made to balance each other out, either completely or partially. Complete equilibration, however, requires the presence of many cylinders. An in-line six cylinder engine is totally in balance, while an in-line four cylinder engine produces relatively significant free forces in the plane passing through the center lines of the cylinders and in the same direction whereas if the connecting rods are not of infinite length in relationship to the crank radius. A two cylinder engine in which the cylinders are positioned in opposing relationship with respect to each other and in which the movement of one piston is a mirror image of the movement of the other, is in good dynamic equilibration except for the tilting moment caused by the fact that the units of the two piston mechanisms do not move in the same plane.

In the majority of piston machines, each piston mechanism unit is balanced per se, by arranging on the crankshaft, opposite the crankpin, equilibrating weights whose moment around the center of rotation of the crankshaft is made equal to the moment of the opposing crank arms, the crankpin, the connecting rod bearing and a certain portion of the connecting rod, the movement of which is considered to be purely rotational and approximately 50 percent of the weight of the piston, complete with piston pin and piston rings, and the portion of the connecting rod which is considered to make a reciprocating movement. Thus, it is said that the reciprocating masses are balanced to about 50 percent. The free forces from the piston mechanism subject the stationary piston of the engine to a force which rotates with the speed of the machine and is approximately constant. If the extent to which equilibration is achieved is less than 50 percent, the free forces become larger in the direction of the cylinder axis and correspondingly smaller transversely of the cylinder axis, while if the extent to which the reciprocating masses are balanced is greater than 50 percent the effect will be the opposite. Despite these precautions, the forces to which the surroundings are subjected by the machines are of a significant and often troublesome magnitude. In many instances, for example, in the case of motorcar engines, the surroundings can be insulated from vibrations to a great extent by securing the machines to their foundations by means of rubber pads. Rubber attachment members can be used efficiently with multi-cylinder machines with which the forces developed by the different piston mechanisms have been balanced out to a high degree, although in the case of single and two cylinder engines the possibility of achieving a good result with rubber attachment members is smaller. Furthermore, in the case of motor vehicles it is often necessary to compromise with respect to the degree of rigidity of the rubber elements. If the rubber elements used are of such softness that no running speed will give rise to frequencies such that the oscillating system, the mass of the engine, the rubber suspensions, come into resonance; a resonant oscillating connected system- engine, rubber suspension, the mass of the vehicle, the wheel suspension springs of the vehicle, is likely to be obtained in which the forced frequency consists of low frequency movements from the wheels of the vehicle rolling over uneven ground. Other disadvantages associated with soft engine suspension systems is that the engine is liable to rock violently with changes in the output torque of the engine. The choice of the degree of flexibility of the rubber suspension is also extremely difficult when the apparatus in which a piston engine is incorporated as the driving source is light in relationship to the engine, and this difficulty is further enhanced if all flexibility between the engine and the apparatus in general must be avoided. Extreme cases are hand tools such as motor saws, for example. If the rubber suspension is of such softness that the engine vibrations are effectively insulated from the machine unit embodying the handle, the suspension must be of such resiliancy that the degree of elasticity between the handle and the guide bar of the saw constitutes an extremely troublesome factor. A compromise solution in such a case may be found in rubber pads so embodied in the apparatus that a certain amount of deformation is obtained when coming into rigid contact with solid stops, or complementary rubber stop elements may be provided which restrict the degree of resiliancy. In this way it is possible to provide good insulation against vibrations when the engine or motor is running and the tool not in use, although the insulation is less efficient when the forces from the tool deform the ordinary rubber suspensions, which have a flat spring characteristic, whereby the engine or motor is connected with the handle over rubber springs of a much steeper spring characteristic.

A large number of different methods have been proposed for reducing the dynamic forces in piston machines. One of the most common of these methods is illustrated in FIG. 1 of the accompanying drawing. In this instance, only the purely rotating masses have been equilibrated, by means of counter weights 1 on the crankshaft. The reciprocating masses, i.e. the piston and associated components and a portion of the connecting rod have been balanced by means of two unbalance members 2. It is obvious, however, that this equilibration will not be complete, primarily because the forces from the unbalance members 2 are sinus shaped with respect of time, while the forces from the piston are not sinus shaped owing to the fact that the connecting rod has a finite length in relation to the crank radius. It is possible to rectify this latter condition by adding to the structure of FIG. 1 further two unbalance members 3 which rotate at twice the speed of the crankshaft (FIG. 2). This is based on the fact that the mathematical expression for the acceleration $a$ of the reciprocating masses can be obtained according to the binominal theorem $$a = r\omega^2(\cos\alpha + b_2 \cos 2\alpha + b_4 \cos 4\alpha + \ldots$$

where $$b_2 = \lambda + \frac{1}{4}\lambda^3 + \frac{15}{128}\lambda^5 + \ldots$$

$$b_4 = -\frac{1}{4}\lambda^3 - \frac{3}{16}\lambda^5 - \ldots$$

and $$\lambda = \frac{\text{the length of the crank arm } (=r)}{\text{the length of the connecting rod } (=l)}$$

The term $r\omega^2\cos\alpha$ is normally designated the first order of acceleration and $r\omega^2 b_2\cos\alpha$ is designated the second order of acceleration etc.

Since $\lambda$ is a relatively small number it will be understood that the approximation $b_2=\lambda$ and $b_4 = 0$ is good, and hence the expression for the acceleration of the reciprocating masses can be written as $$a = r\omega^2 (\cos \alpha + \lambda \cos 2\alpha).$$

It will readily be perceived that the terms become progressively smaller with higher order numbers and that great advances can be made by simply compensating the first and second order. In the embodiment of FIG. 1 the first order of acceleration has been eliminated, while in FIG. 2 both the first and the second order of acceleration have been eliminated.

The illustrated construction, however, is extremely clumsy and has not been used to any great extent in practice, since the reciprocating masses on the crankshaft are not balanced out, the stresses and strains on the crankshaft bearings are very high, and thus these bearings must be made stronger than would otherwise be necessary and the unbalance members 2 in the embodiments of FIG. 1 and FIG. 2 become so large that the bearings for the same must be made quite robust. The transmission between the crankshaft and the shafts, gearwheels or chain gears of the unbalance members also create a problem in the form of noise and space requirements.

If, instead of considering the unbalanced conditions of the crank movement mechanisms in the above discussed conventional manner, a study is made of how the center of gravities of the different components, crankshaft, piston with associated components and connecting rod move in a fixed co-ordinate plane during one revolution of the crankshaft and these are combined to form one single common center of gravity movement, it will be found, providing that the reciprocating parts have been equilibrated to 50 percent by the presence of counter-weights on the crankshaft, that this common center of gravity moves in a substantially circular path 4, as illustrated in FIG. 3, the "circle" passing in a direction of rotation opposite to that of the crankshaft.

The different components of the crank movement have been considered here as mass points, which is a correct assumption with the exception of the connecting rod, which also executes a pivoting movement giving rise to a "tilting moment."

In order to illustrate by digital information the magnitude of the "circle" which constitutes the common center of gravity path described by the crank movement components and the tilting moment from the connecting rod the following data has been taken from the motor of a motor-saw:

| | |
|---|---|
| Crank radius | $r = 18$ mm |
| Length of connecting rod | $1 = 70$ mm |
| Weight of the crankshaft | 400 g |
| Piston weight incl. associated components | 100 g |
| Connecting rod weight | 65 g |
| Moment of inertia $J_{tp}$ of the connecting rod | $0.69 \cdot 10^{-4}$ kgm² |

FIGS. 3 and 3a illustrate the shape of the path described by the common center of gravity and how the path is oriented in relation to the engine. As will be seen from the figures, this path is approximately circular in shape with an average radius of 4.6 mm. The common center of gravity would have described an exact circle if the connecting rod 1 had been of infinite length. The extent to which the path illustrated in FIG. 3a deviates from a true circle is illustrated in a scale of 4:1 with the recited magnitude of $\lambda = 0.257$.

The tilting moment for the connecting rod at 7,000 rpm has been calculated below for the saw-motor mentioned above and taken by way of example, the calculations being seen with reference to FIG. 4.

$r=18$ mm, $1=70$mm, $1^2=4,900$mm², $r^2-1^2= -4,576$ mm²

$n = 7,000$ rpm gives $= (7,000/60) 2$ rad/sec, $^2 = 53.8 \cdot 10^4$ sec⁻².

The connecting rod moment is illustrated in the diagram as a function of the rotation angle of the crankarm in FIG. 5. By way of comparison a pure sinus curve is shown in a dotted line. The connecting rod moment is significantly high, being of the same order of magnitude as the moment of the engine.

SUMMARY OF THE INVENTION

Knowledge of these properties of the piston crank mechanism can be used to solve the vibration problem in piston machines. With the present invention, the theories developed whereby with knowledge of the approximately circular path described by the common center of gravity (for the piston mechanism) and knowledge of the tilting moment of the connecting rod can be used to determine how the machine body will move under the forces occurring in the machine and the machine can be mounted in a manner which permits it to move freely without exerting forces on the base structure. When applying the theory in practice, a devibrating means is applied to the machine, the construction and design of said means being developed through the invention, which is mainly characterized by the fact that arranged between the machine body and the base structure are movement mechanisms which create relative movements between the machine and the base structure, said movements at least partially eliminating vibrations in the base structure caused by internal dynamic forces in the machine when in use.

BRIEF DESCRIPTION OF THE DRAWINGS

The invention will now be described in detail with reference to an embodiment of a de-vibrating system based on the aforementioned theory and illustrated in the accompanying drawings, of which FIGS. 1-5 have already been discussed, while the remaining FIGS. illustrate the properties of and the components of such a de-vibrating system. Thus FIG. 1 illustrates a piston crank mechanism provided with two rotating counter weights in addition to the counter weight arranged on the crank shaft, FIG. 2 illustrates a piston crank mechanism provided with additional two rotating counter weights, FIG. 6 illustrates a single-cylinder engine mounted on rubber pads as seen in a horizontal view, FIG. 7 illustrates the same engine as that illustrated in FIG. 6 but seen in a vertical view, FIG. 16 illustrates the vibration movement of a three-cylinder in-line engine having a 120° crank angle.

DETAILED DESCRIPTION OF THE INVENTION

Figure 5:
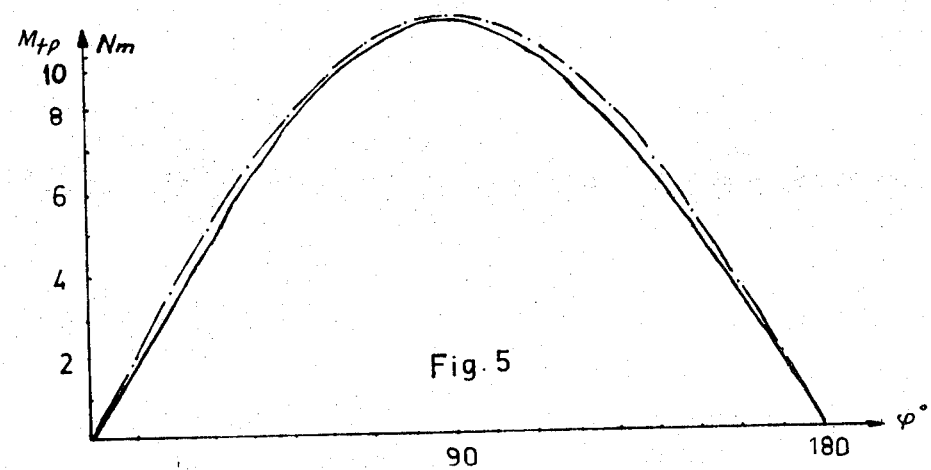
FIG. 5 illustrates a graph of the tilting moment of the connecting rod and a sinus curve in morse lines for a special motor as a function of the angle of rotation of the crank shaft at 7,000 rpm.
Figure 3:
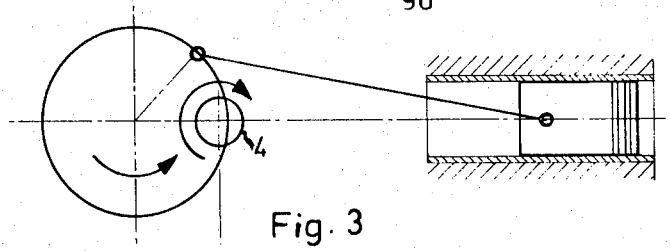
FIG. 3 is a diagramatic representation of the path described by the common center of gravity (for the piston crank mechanism)
Figure 3A:
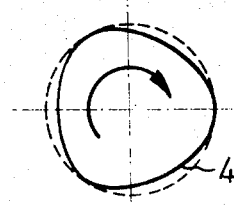
FIG. 3a illustrates in larger scale the actual path of the center of gravity compared with a circle (in dash lines)
Figure 4:
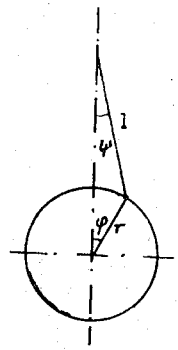
FIG. 4 is a diagram showing denominations in a piston crank mechanism.

In the aforegoing discussion with respect to those moments and forces which occur in piston crank mechanisms, the path described by the center of gravity of the piston crank mechanism and the pendulation of the connecting rod have been discussed separately as two systems and when constructing a de-vibration system it is suitable to follow this division. For the sake of simplicity a de-vibration system according to the first mentioned system for a single-cylinder motor will be discussed first, of which motor the center of gravity of the stationary portion (cylinder, crank housing, carburetor, ignition means etc.) is assumed to lie in the same plane as and coinciding with the center of the approximate circular path in which the common center of gravity of the piston crank mechanism moves. The system is illustrated in principle in FIGS. 6 and 7 and is based on an engine having a horizontal cylinder 5, a crank housing 6 and a vertical crank shaft 7. The engine rests on three rubber pads 8 placed in a triangle on a base plate 9 with all the pads located in one plane parallel with the plane in which the common center of gravity of the piston crank mechanism moves and afford a very soft seating in all directions parallel with this plane. By means of a cam mechanism fixed in the base plate and a drive means having an engagement point at "center of gravity" 10 (the spring characteristic, i.e. the load/displacement compared with mass "calculated center of gravity") of the three rubber pads 8, the engine can now be made to effect a movement which is equivalent but opposite to the movement which the common center of gravity of the piston crank mechanism carries out when the engine is running. By giving the radius, which varies with different angular positions in the identical movement, specific values it will happen that the engine will not transmit to the base structure dynamic forces created by the movement of the common center of gravity of the piston crank mechanism. (The tilting moment from the oscillations of the connecting rod will remain however.) It is true that "internal forces" will occur between the base and the engine, but these fully balance each other out. The rubber pads exert a resistance to the movement with a certain rotating force vector, but the same force vector (in the opposite sense) is also found in the mechanism which moves the engine relative to the base. No other forces occur in the mechanism than those which are created by the rigidity of the rubber pads and the weight of the engine, depending on how the engine is positioned. Greater distances between the pads permit the use of very soft pads. The mechanism thus becomes moderately loaded and can be made simple and inexpensive. This is true providing that only engine torque is taken out. If the torque is taken out by belts, chains or gear wheels, the mechanism is loaded with peripheral forces from the transmission. Naturally there are other modes of use of the engine which can give other radial loads on the mechanism; the forces should pass through the mechanism and preferably perpendicular to the longitudinal direction of the crank shaft.

The mechanism can engage the engine at any point whatsoever within the attachment plane of the rubber pads, provided that it coincides with the common "center of gravity" of the rubber pads. Thus, the point of engagement may also lie approximately in the center of the crank shaft.

Figure 8:
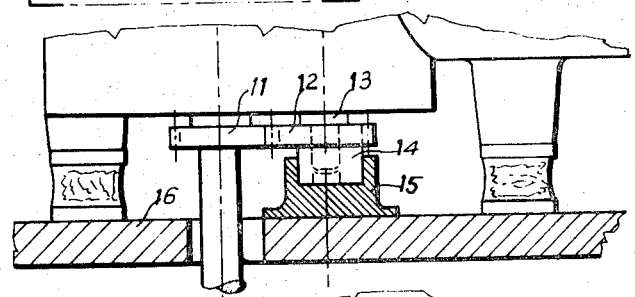
FIG. 8 is a movement mechanism between a base plate and the engine illustrated in FIGS. 6 and 7.
Figure 9:
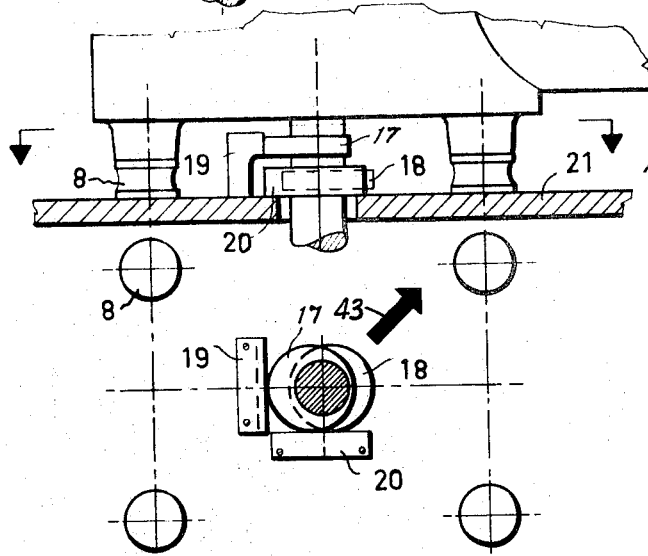
FIG. 9 illustrates another movement mechanism between a base plate and the engine illustrated in FIGS. 6 and 7.

Two examples of mechanisms for moving the engine in a rotary path relative to the base plate are illustrated in FIGS. 8 and 9. The mechanism illustrated in FIG. 8 has a gear wheel 11 which is securely mounted on the crank shaft and drives a second gear wheel 12. Both gear wheels have the same number of teeth. The gear wheel 12 is journalled on a pin 13 which is fixedly mounted in the engine and has an eccentric projection 14 which extends into a bearing box 15 which is securely mounted to base 16. The geometrical axis for the gear wheel 12 passes through the "centre of gravity" of the rubber pads. This mechanism will only give a circular movement to the engine and consequently does not take into consideration the particular path described by the common centre of gravity of the piston crank mechanism. FIG. 9 illustrates a mechanism with which it is assumed that the centre of gravity of the rubber pads lies approximately in the centre of the crank shaft. Cam plates 17 and 18 are securely mounted to the crank shaft and extend towards two slide rails 19 and 20, which are securely mounted to a base 21. A spring (not shown) biasing in the direction shown by the arrow is anchored at one end in the engine and the other at the base, with the spring ensuring that the two side rails 19 and 20 are in constant contact with the cam plates 17 and 18. Naturally, constant contact between the cam plates may also be effected by pre-tensioning the rubber pads, although a metal spring is more positive, with view to the fact that rubber under constant tension has a tendency to creep and become permanently set. With constructions in which lateral forces occur on the engine shaft, the slide rails are naturally positioned so that these forces act in the direction of the arrow 43. This cam mechanism gives the base a circular movement which is executed in the opposite sense to the direction of rotation of the crank shaft. It will readily be perceived that the aforementioned non-circular path of movement can be achieved by a shape different to the circular shape of the two cam plates.

Figure 10:
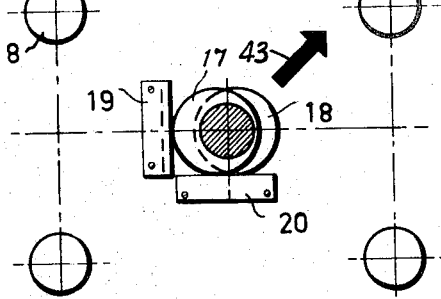
FIG. 10 illustrates elements of the movement mechanism shown in FIG. 9, FIGS. 11 – 13 illustrate a single-cylinder engine mounted on rubber pads.

With the embodiment of FIG. 10 the slide rails 19, 20 are arranged perpendicularly to each other. If the engine is used so that lateral forces can arise on the engine shaft in directions which alternate within an area which approaches or exceeds 90°, the angle between the slide rails may be greater than 90°. If the engine is used in a manner whereby lateral forces may arise on the engine shaft in any direction the arrangement may be provided with double slide rails for each cam disc, for example displaced through 180°. In the case of non-circular cam plates, one slide rail is arranged resiliently against the cam plate. With large deviations from a circular shape and/or extremely large external forces the cam plates may also be doubled, so that one pair of cam plates provide movement in one direction and the other pair in a direction displaced, for example through 90°, from the first. This elastic erection of the engine and drive means for moving the engine in a rotary movement is thus able to eliminate vibrations passing from the engine to the base plate caused by the common center of gravity of the piston crank mechanism in a closed path.

It is, however, only a portion of the total vibrations which can be eliminated by means of such a system. Vibrations caused by the tilting moment of the connecting rod are of significant magnitude and a system for eliminating these vibrations will now be described. The description will be made on the basis of the erection of the motor as illustrated in FIGS. 9 and 10, and in FIGS. 11 – 13 the engine is illustrated in three different angular positions on the base plate while simultaneously carrying out the aforementioned rotary movement and the rotary movement caused by the tilting moment of the connecting rod. In the figures, certain of the components have a common designation. These being the attachment of the rubber pads to the engine is illustrated with ●
attachment of the rubber pads to the base plate is illustrated with ○
the cam mechanism and the center of the crank shaft are illustrated with C and
the center of gravity of the engine is illustrated with M.

Figure 11:
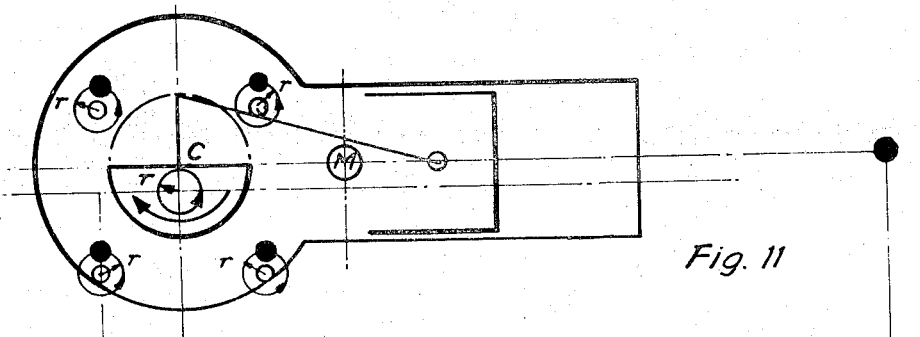

FIG. 11 illustrates how, with the use of suitable cam plates, the movement of the engine body in relation to the base plate required by the movement of the common center of gravity of the piston crank mechanism has been obtained, i.e. all points on the engine move in the same closed, substantially circular path, having a mean radius $r$, in relation to the base plate. The center C of the cam mechanism and the crank shaft coincides, as previously, with the "center of gravity" of the rubber pads.

Under the influence of the tilting moment of the connecting rod, the engine, according to the laws of mechanics, will pendulate around an axis passing through the center of gravity of the engine parallel with the crank shaft (i.e. one of the three main inertia axes which all pass through the center of gravity). As will be seen from FIG. 12, the requisite tilting movement is obtained with only one single cam plate.

Figure 12:
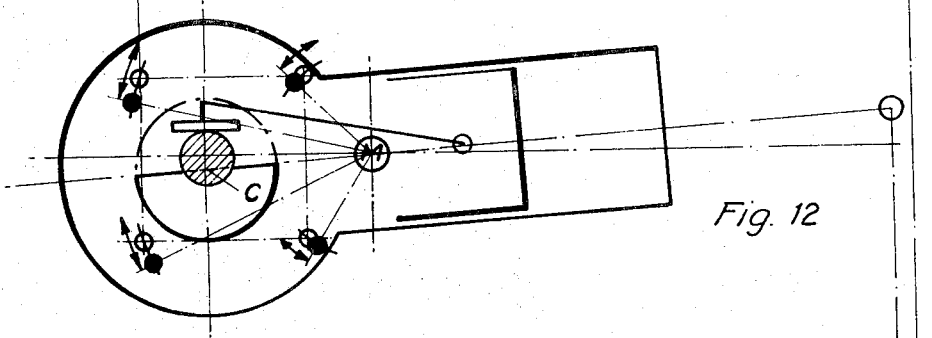

FIG. 11 shows the engine in the farthest displaced position at right angles to the long axis of the cylinder (since the mentioned path of the center of gravity is substantially circular in shape this displacement is approximately the same in all directions). A corresponding position of the piston crank mechanism is also shown. FIG. 12 illustrates the largest angular deflection of the engine and the corresponding position for the piston crank mechanism. As will be seen, the position of the piston crank mechanism is the same in the two figures. It will be seen from the figures that the two movements counteract each other to the left of the center of gravity of the engine and are added to the right thereof.

The principle for total equilibration of the vibrations is based on the concept of superposing these two movements one with respect to the other by means of, for example, a device similar to that illustrated in FIGS. 9 and 10. The movement component parallel with the cylinder axis is caused by the cam plate 17 and the slide rail 19 (FIG. 10) and is not affected by the attempt to superpose a tilting movement. Thus, the cam plate 17 and the slide rail 19 shall not be changed in any way. Furthermore, it is obvious that this movement component is not affected by movement through a distance $x$, marked on FIGS. 11 and 12.

Figure 13:
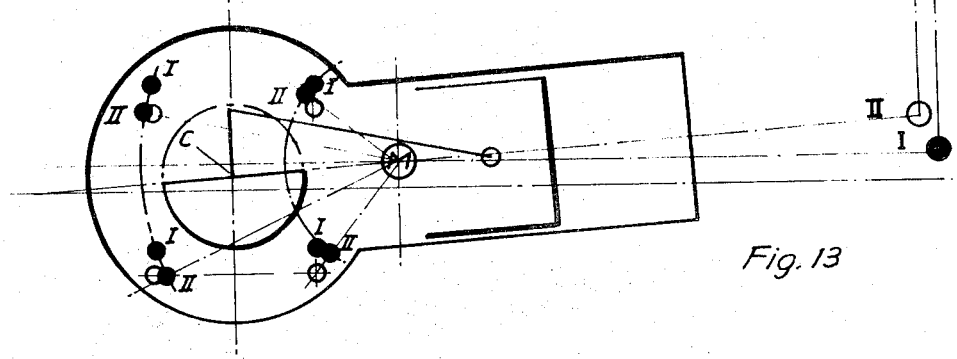

FIG. 13 illustrates how the two movements are superimposed on top of each other. The line and the points I illustrate the symmetry line of the engine and the attachment points of the engine pads to the engine respectively according to FIG. 11. The line and the points II illustrate corresponding positions when the movements illustrated in FIG. 12 are superimposed. It will now be seen that the amplitude of the movement caused by the cam plate 18 and the slide rail 20 in FIG. 10 shall be reduced by an amount which corresponds to the amplitude of the tilting movement of the crank shaft, the cam plate center, which is purely a question of the shape of the cam plate 18.

In this way, the forces which are transmitted from the engine to the base can be reduced, although a moment is transmitted from the engine to the base over the rubber pads, which is not eliminated by the basic principle (see the previous presentation) on counter-directed forces or pairs of forces created by the cam mechanism. Movement of the rubber pads through the distance $x$ (FIG. 12) has only a limited effect, if any effect at all. For this reason this movement is not embodied in the structure of FIG. 13. The simple expedient of providing the cam plate 18 illustrated in FIG. 10 with a shape having regard to the tilting movement of the connecting rod has a very favorable influence, however.

Figure 14:
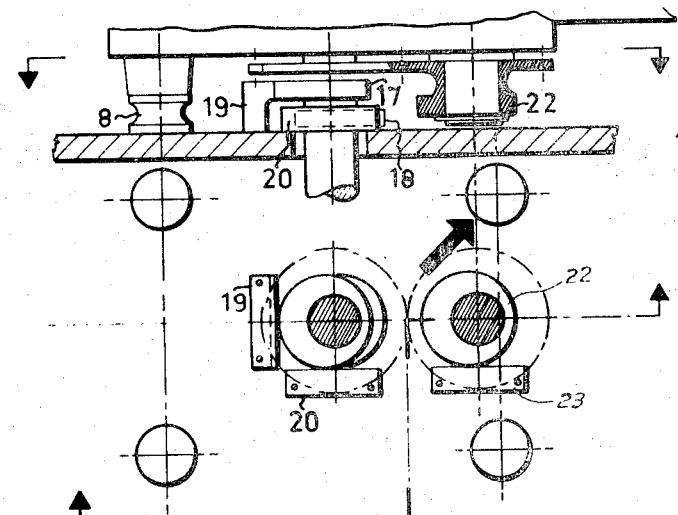
FIG. 14 illustrates a movement mechanism between two shafts between the base plate and the engine shown in FIGS. 11 – 13.
Figure 15:
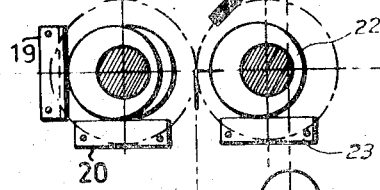
FIG. 15 illustrates in horizontal view the mechanism shown in FIG. 14.

The following description, however, is made with respect to a development of the system which completely eliminates the moments caused by the tilting movement of the connecting rod. This modified system is illustrated in FIGS. 14 and 15. An additional cam plate 22, a slide rail 23 and a spring (not shown but the biasing direction of which is illustrated by the arrow) causes the "missing" forced movement component between engine and base required for providing the forced movement, synchronous with the speed of the engine, between the engine and the base, which exactly coincides with the movement which the vibration forces will cause the engine to effect. In the mechanism or mechanisms which cause this movement are created forces and pairs of forces which, with respect to magnitude and direction, completely counteract the forces which the rubber pads exert on the base structure. In the embodiment illustrated in FIGS. 14 and 15, the cam plate is driven by the cam shaft provided with gear wheels. For the purpose of reducing the peripheral speeds of the gear wheels, an intermediate wheel can be arranged, with the direction in which the illustrated cam plate rotates in relation to the engine being of no importance. Alternatively, a chain drive or some other appropriate means for positively transferring rotational movements can be used.

If suitable, the cam plate may be driven at a speed different to that of the engine, for example a speed which is only half that of the engine, whereby in the case of a four-stroke engine, engine, the cam plate may simply be mounted on the existing cam shaft for the valve mechanism of the engine. In such instances it is only necessary to give the cam plate a corresponding shape.

By introducing a second cam plate shaft in the system, the mean point for the center of gravity path of the piston crank mechanism can be located to the side of the center of gravity of the body of the engine (although in the same plane). The small amount of torque which occurs as a result of the original condition no longer being fulfilled is readily eliminated by giving the tilting movement cam plate and the main cam plates which create a movement perpendicular to the cylinder of the engine an appropriate form.

The above example of de-vibrating means has been given with respect to single-cylinder engines, although de-vibrating means for multi-cylinder engines can also be constructed. A truly statically equilibrated in-line four-cylinder engine has no other vibrations than a rectilinear upwardly and downwardly acting force lying in the cylinder plane centrally of the two middle cylinders. Provided that the center of gravity of the engine is located in the cylinder plane centrally of the two middle cylinders, it is possible to suspend the engine at one end and to produce by means of one single cam plate and slide rail the rectilinear forced relative movement between engine and base required in order to counteract the forces which the rubber pads exert on the base.

Figure 17:
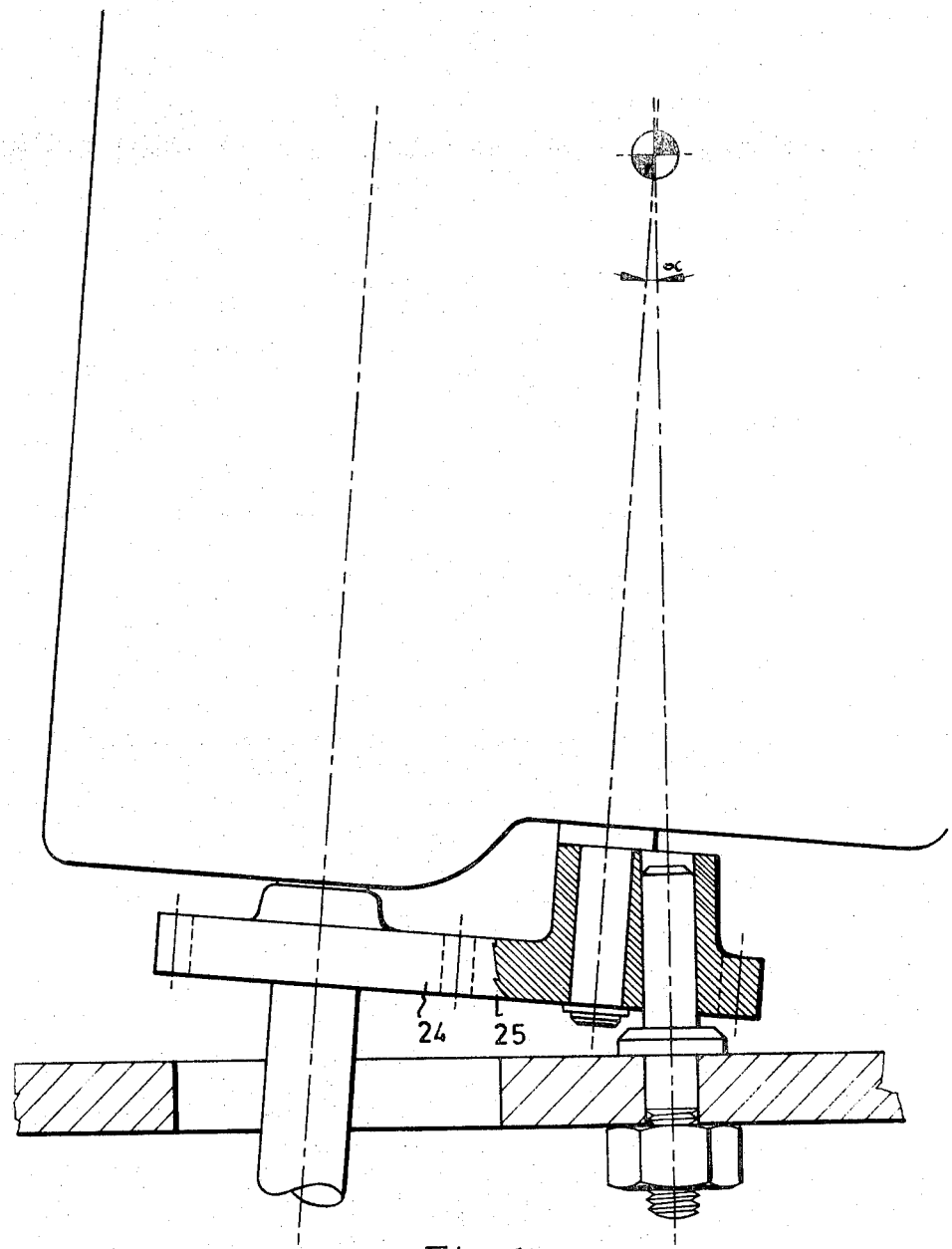
FIG. 17 illustrates the mechanism for effecting the movements illustrated graphically in FIG. 16.

An in-line three-cylinder engine having a 120° crank angle can also be efficiently served with a simple system. When studying the three rotary force vectors which arise owing to the fact that the common center of gravity of the three piston crank mechanisms describes an approximately circular path with opposite senses of rotation in relation to the engine, it will be found that they can be replaced by two force vectors at each end of the engine and displaced in relation to each other through 180° and also rotating in the direction of rotation of the engine. Thus, the engine will effect a movement such as that illustrated in FIG. 16. Consequently, a system which provides the requisite forced relative movement between engine and base may be constructed in the manner illustrated in FIG. 17. For the sake of clarity, the angle $\alpha$ is greatly exaggerated, and it should be noted that this angle can never be of such magnitude that the two shafts in gear wheel 25 driven by crank shaft gear wheel 24 lie adjacent each other as illustrated in the figure. With an operational engine, the angle $\alpha$ is of the order of some tenths of a degree.

The piston machines discussed above possess relatively uncomplicated properties with regard to center of gravities and symmetry, and consequently the de-vibrating system has obtained a simple construction. There exist machines, however, with which no simplified conditions in the aforementioned respects apply, and the machines are therefore liable to produce complicated vibration movements which are practically impossible to analyse. On the other hand, however, it is always possible to measure the vibrations in different directions and, with the guidance of the values obtained, to construct a system for producing a three-dimensional movement between the machine and its base structure in a manner whereby the vibrations are held within the machine. One embodiment of such a system is illustrated diagramatically in FIG. 18, in which the different operations for effecting the movements are the same as those recited in the description of the embodiments illustrated in FIGS. 9–15. Consequently, the holding springs, the base structure and the rubber pads have not been drawn in the figures, although their pressure is tacitly implied. The figure illustrates a piston crank mechanism comprising a piston 26, a connecting rod 27 and a crank shaft 28a, while mounted on both sides of the crank elbow are double cam plates 28, 29, 30 and 31. Also securely mounted on one side of the crank shaft is a gear wheel 32. The gear wheel 32 is arranged to drive a second gear wheel 33 having the same number of teeth as the gear wheel 32. The gear wheel 33 is securely mounted to the crank housing and drives a fifth cam plate 34. In the manner previously illustrated, the five cam plates are urged against slide rails 35, 36, 37 and 38 securely mounted in the base structure, either by means of springs or by pre-tensioning the engine pads in the manner described above. Located on the double cam plate 30, 31 and on the cam plate 34 are projecting portions 39 and 40, respectively, which constitute axial cam plates. The axial cam plates 39 and 40 are biased against two slide rails 41 and 42 securely mounted to the base structure by springs or pre-tensioned engine pads.

When the machine is in operation, this system of cam plates and slide rails provide for a three-dimensional movement of the machine body relative to the base structure. As with the embodiment illustrated in FIG. 10, the cam plates 28–31 are secured to the ends of the crank shaft, and the slide rails 35–38 give the engine an approximate circular movement path in the plane of the connecting rod. The cam plate 34 and the slide rail 38 together with the previously mentioned cam plates create a tilting movement, such as that described with reference to the embodiment of FIG. 15, there being provided an additional tilting movement perpendicular to the first mentioned tilting movement, i.e. in the horizontal plane for the machine illustrated in FIG. 18. This tilting movement is caused, for example, by the fact that the center of gravity of the machine lies outside the plane of the connecting rod and is created in the apparatus by means of the two axial cam plates 39, 40 and the slide rails 41, 42.

The machine elements should be dimensioned in accordance with the values obtained when measuring the vibrations taken up in each particular de-vibrating case. Thus, in practice the system will obtain considerably smaller dimensions in relation to the piston machine than those illustrated in FIG. 18, in which for the sake of clarity the system has been exaggerated in relation to the machine. Moreover, the gear wheels 32, 33 can be replaced, for example, with a chain transmission means.

Figure 18:
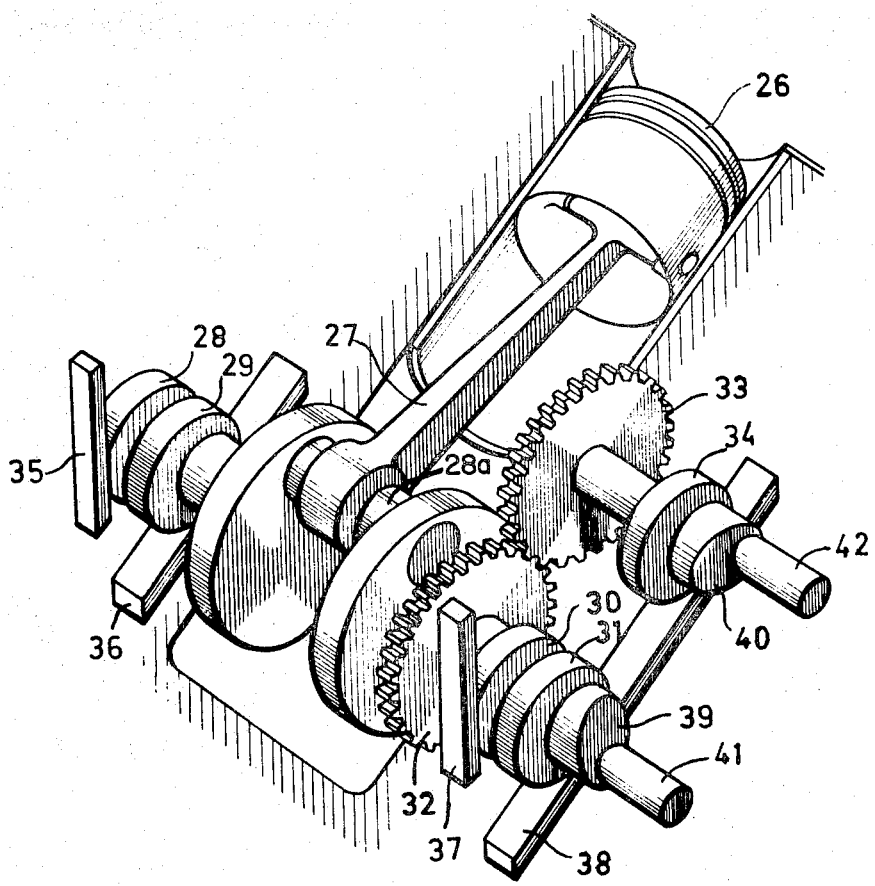
FIG. 18 illustrates a mechanism for arbitrary three dimensional movement of a piston machine.

The embodiment illustrated in FIG. 18 represents a general system for de-vibrating a machine. Naturally, the main application for such de-vibrating systems is with piston machines, although other machines which generate internal dynamic forces give rise to undesirable vibrations when in use and can be made a subject of the above advanced theory of movement mechanisms between machine and the base structure. The described de-vibrating systems relate to the most common and most noticable causes of vibrations in machines. It is, however, possible to combine the systems with other de-vibrating systems constructed for other reasons of vibration. The main principle for these systems however, is that the machine, owing to forced movements of an arrangement between the machine and its base structure, do not exert forces on the base structure as a result of the reasons which have been previously discussed. Although the invention has been described and illustrated with respect to a number of different embodiments and machines, it will be understood that the invention is not restricted thereto but can be modified within the scope of the accompanying claims.

What is claimed is:

1. A vibrationless machine including a machine body, a base structure and at least one piston-crank-mechanism in the machine body constituted by a cylinder, a piston, reciprocable in the cylinder, a connecting rod and a crank shaft journalled in the machine body, at least one movement mechanism having one cam plate and one slide block each journalled and placed in the machine body and the base structure, respectively, driving means for driving said cam plate from the crank shaft at the same r.p.m. as said crank shaft, and elastic means supporting the machine body from the base structure, in which said elastic means are arranged between the base structure and the machine body with a pretension actuating said cam plate and slide block into abutment with each other.

2. The machine according to claim 1, characterized in that said elastic means are in the form of pads of an elastic material located in a plane which is substantially perpendicular to the crank shaft direction of the machine.

3. A vibrationless machine including, a machine body, a base structure and at least one piston-crank-mechanism defined by a cylinder, a piston, reciprocable in the cylinder, a connecting rod and a crank shaft journalled in the machine, at least one movement mechanism having one cam plate and one slide block each journalled and placed on the machine body and the base structure, respectively, driving means for driving said cam plate from the crank shaft at the same r.p.m. as said crank shaft, and elastic means supporting the machine body from the base structure, the elastic means being arranged between the base structure and the machine body with a pretension actuating said cam plate and slide block into abutment with each other, said elastic means being in the form of pads of an elastic material located in a plane which is substantially perpendicular to the crank shaft direction of the machine, and said piston-crank-mechanism having a common center of gravity passing through a plane closed path, when the machine is running, with said plane path parallel to the plane through said pads, and said cam plate being shaped in the same manner as the plane path.

4. The machine according to claim 3, characterized in that said cam plate is constituted by an eccentric rotatably supported by means of a shaft in the machine, and said slide block constituted by a ring which surrounds the eccentric.

5. A vibrationless machine including, a machine body, a base structure and at least one piston-crank-mechanism defined by a cylinder, a piston, reciprocable in the cylinder, a connecting rod and a crank shaft journalled in the machine, a first movement mechanism having one cam plate and one slide block each journalled and placed on the machine body and the base structure, respectively, driving means for driving said cam plate from the crank shaft at the same r.p.m. as said crank shaft, and elastic means supporting the machine body from the base structure, the elastic means being arranged between the base structure and the machine body with a pretension actuating said cam plate and slide block into abutment with each other, said elastic means being in the form of pads of an elastic material located in a plane which is substantially perpendicular to the crank shaft direction of the machine, and said connecting rod having a moment of inertia pendulating between two outer positions when the machine is running, and a second movement mechanism, including a cam plate and slide block, each journalled and placed on the machine body and base structure, respectively, with one of said cam plates displaced angularly in relation to the other, thereby providing a pendu-lating moment to the machine body in relation to the base structure, with the pendulating movement being of the same magnitude as and directed oppositely to the tilting moment of inertia of the connecting rod.

6. The machine according to claim 3, characterized in that two cam plates of two different movement mechanisms are positioned axially displaced side by side on said shaft, and that two slide blocks positioned substantially perpendicularly to each other cooperate with each one of said cam plates.

7. The machine according to claim 6, characterized in that said two mechanisms cooperate in providing a motion of the machine body relatively the base structure which motion is substantially congruent with said closed path described by said common center of gravity, when the machine is running.

* * * * *